United States Patent
Dorcey

(10) Patent No.: US 9,705,997 B2
(45) Date of Patent: Jul. 11, 2017

(54) SYSTEMS AND METHODS FOR LOCATION-BASED SOCIAL NETWORKING

(71) Applicant: Timothy Dorcey, Santa Monica, CA (US)

(72) Inventor: Timothy Dorcey, Santa Monica, CA (US)

(*) Notice: Subject to any disclaimer, the term of this patent is extended or adjusted under 35 U.S.C. 154(b) by 0 days.

(21) Appl. No.: 15/196,029

(22) Filed: Jun. 29, 2016

(65) Prior Publication Data

US 2017/0006120 A1 Jan. 5, 2017

Related U.S. Application Data

(60) Provisional application No. 62/186,881, filed on Jun. 30, 2015.

(51) Int. Cl.
| | |
|---|---|
| *G06F 15/16* | (2006.01) |
| *H04L 29/08* | (2006.01) |
| *H04W 12/08* | (2009.01) |
| *H04W 12/02* | (2009.01) |
| *H04W 4/02* | (2009.01) |

(52) U.S. Cl.
CPC ............. *H04L 67/18* (2013.01); *H04L 67/02* (2013.01); *H04W 4/021* (2013.01); *H04W 12/02* (2013.01); *H04W 12/08* (2013.01)

(58) Field of Classification Search
CPC ......... G06Q 50/01; H04L 51/32; H04L 67/22; H04L 65/403; H04L 67/18; H04L 12/1818; H04L 12/1813; H04L 51/20; H04L 63/101; H04L 67/12
See application file for complete search history.

(56) References Cited

U.S. PATENT DOCUMENTS

| | | | | |
|---|---|---|---|---|
| 8,923,551 | B1* | 12/2014 | Grosz | H04N 1/00145 382/100 |
| 2005/0225647 | A1* | 10/2005 | Gossweiler | G06F 17/30265 348/211.3 |
| 2005/0259638 | A1* | 11/2005 | Burg | H04L 12/1813 370/352 |
| 2006/0080286 | A1* | 4/2006 | Svendsen | G06F 17/30265 |
| 2007/0078846 | A1* | 4/2007 | Gulli | G06F 17/30247 |
| 2010/0106573 | A1* | 4/2010 | Gallagher | G06Q 30/02 705/14.4 |
| 2012/0069131 | A1* | 3/2012 | Abelow | G06Q 10/067 348/14.01 |

(Continued)

*Primary Examiner* — David Lazaro

(57) ABSTRACT

The present disclosure provides a system and method that generates and provides access to communication forums based on metadata associated with images. For example, when a first user captures an image with his or her computing device, the computing device will associate metadata with the image, which may include at least location information and time information. A control server having access to only the metadata may cluster the image individually or with one or more other images that were captured within a threshold proximate distance and a threshold proximate time of where and when the image was captured, respectively. The control server may associate a communication forum with the cluster, such that only users associated with images that are within the cluster are provided access to the communication forum. The user's computing device may then associate the communication forum with the image content stored on the user's computing device.

20 Claims, 6 Drawing Sheets

(56) References Cited

U.S. PATENT DOCUMENTS

| | | | | |
|---|---|---|---|---|
| 2012/0109955 A1* | 5/2012 | Lahcanski | ......... | G06F 17/30241 |
| | | | | 707/737 |
| 2013/0027428 A1* | 1/2013 | Graham | ................. | H04L 51/32 |
| | | | | 345/633 |
| 2013/0128038 A1* | 5/2013 | Cok | ....................... | H04N 7/002 |
| | | | | 348/143 |
| 2014/0016872 A1* | 1/2014 | Chao | ..................... | G06K 9/622 |
| | | | | 382/218 |
| 2014/0193047 A1* | 7/2014 | Grosz | ................... | G06F 3/1242 |
| | | | | 382/118 |
| 2015/0296338 A1* | 10/2015 | Xu | ......................... | H04L 51/20 |
| | | | | 455/456.3 |

* cited by examiner

SYSTEMS AND METHODS FOR LOCATION-BASED SOCIAL NETWORKING

CROSS-REFERENCE TO RELATED APPLICATIONS

This application claims the benefit of Provisional Patent Application No. 62/186,881, filed on Jun. 30, 2015, the entire contents of which are hereby incorporated herein by reference.

BACKGROUND

There are many different platforms available to users in order to discover other people and subsequently communicate with each other. These platforms may include dating applications, social networks, etc. However, use of these platforms may reveal a great deal of personal information, either directly or by association with the user identity, which may not always be desirable if the immediate aim is only to enable communication.

Furthermore, one or more users that are somehow acquainted to each other, either directly or indirectly, may not know that they have similar interests or have frequented similar places. In addition, people that have attended certain events, social gatherings, etc., may want to exclusively discuss that event among friends who have attended that particular event or social gathering, or alternatively have the benefit of meeting new like-minded people.

SUMMARY

A system and method that creates communication forums based on images captured by users is disclosed herein. A user may be granted access to a given communication forum if the user has captured an image, using his or her computing device, within a threshold proximate distance and within a threshold proximate time period of the other images associated with the communication forum. In this regard, a cluster may be formulated around those images, and associated with that cluster may be a communication forum that has been generated. Any future images that are then captured within a threshold proximate distance from that cluster and within a threshold proximate time period may then be granted access to the communication forum as well.

If no other images are identified as being within a threshold proximate distance and within a threshold proximate time period, then a new cluster may generate only around that captured image. Subsequent images may be included in that cluster as in the foregoing. As an alternative, or additionally, the user may be granted access to a second type of communication forum if his or her image was captured within a threshold proximate distance of the other images, irrespective of the time the images were captured. A method to permit access to a communication forum based on a location and time a photograph is captured by a computing device is disclosed herein. The method comprises receiving, using one or more processors, metadata associated with a first image, wherein the metadata includes location information as to where the first image was captured; generating, using the one or more processors, a first cluster associated with the first image based on the location information; generating, using the one or more processors, a first communication forum that is associated with the first cluster; an permitting, using the one or more processors, a first user access to the first communication forum only when the first user is associated with a first computing device that was used to capture the first image.

In that example, the metadata includes time information as to when the first image was captured, and the method further includes: generating, using the one or more processors, a second cluster associated with the first image based on the location information and the time information; generating, using the one or more processors, a second communication forum that is associated with the second cluster; and permitting, using the one or more processors, the first user access to the second communication forum only when the first user is associated with a first computing device that was used to capture the first image. The method further includes identifying, using the one or more processors, metadata of a second image that was captured within a threshold proximate distance and within a threshold proximate time of the second cluster; including, using the one or more processors, the second image into the second cluster; and permitting, using the one or more processors, a second user access to the second communication forum only when the second user is associated with a second computing device that was used to capture the second image. As a further example, the method includes providing, using the one or more processors, the second user access to the second communication forum under anonymity, such that no other user within the second communication forum is able to identify an identity of the second user; providing, using the one or more processors, an anonymous indicator, wherein the anonymous indicator at least indicates a change in an amount of users within the second communication forum when the second user is provided access to the second communication forum, and the anonymous indicator does not identify the identity of the second user; and upon a control server receiving a signal from the second user, revealing the identity of the second user to the other users within the second communication forum. The method may further include displaying, using the one or more processors, on a display of the first computing device an event list and a place list, wherein the event list only displays communication forums that are based on location and time information, and the place list only displays communication forums that are based on location information. As another example, the first image was captured at a time prior to the first user transmitting a first signal to a control server from any computing device associated with the first user. As a further example, the threshold proximate distance and the threshold proximate time adjust according to a sliding scale, such that the threshold proximate distance varies based on a time the second image was captured relative to the second cluster.

A system configured to permit access to a communication forum based on a location and time a photograph is captured by a computing device is also disclosed herein, and the system includes memory; and one or more processors operatively coupled to the memory. The one or more processors are configured to: receive metadata associated with a first image, wherein the metadata includes location information as to where the first image was captured; generate a first cluster associated with the first image based on the location information; generate a first communication forum that is associated with the first cluster; and permit a first user access to the first communication forum only when the first user is associated with a first computing device that was used to capture the first image.

As a further example, the metadata includes time information as to when the first image was captured, and the one or more processors are further configured to: generate a second cluster associated with the first image based on the location information and the time information; generate a second communication forum that is associated with the second cluster; and permit the first user access to the second communication forum only when the first user is associated with a first computing device that was used to capture the first image.

As another example, the system is further configured to: identify metadata of a second image that was captured within a threshold proximate distance and within a threshold proximate time of the second cluster; include the second image into the second cluster; and permit a second user access to the second communication forum only when the second user is associated with a second computing device that was used to capture the second image. The system is further configured to: provide the second user access to the second communication forum under anonymity, such that no other user within the second communication forum is able to identify an identity of the second user; provide an anonymous indicator, wherein the anonymous indicator at least indicates a change in an amount of users within the second communication forum when the second user is provided access to the second communication forum, and the anonymous indicator does not identify the identity of the second user; and upon a control server receiving a signal from the second user, reveal the identity of the second user to the other users within the second communication forum. As another example, the system is configured to display on a display of the first computing device an event list and a place list, wherein the event list only displays communication forums that are based on location and time information, and the place list only displays communication forums that are based on location information. As another example, the first image was captured at a time prior to the first user transmitting a first signal to a control server from any computing device associated with the first user. In another example, the threshold proximate distance and the threshold proximate time adjust according to a sliding scale, such that the threshold proximate distance varies based on a time the second image was captured relative to the second cluster.

DETAILED DESCRIPTION

The aspects, features and advantages of the present disclosure will be appreciated when considered with reference to the following description of preferred embodiments and accompanying figures. The following description does not limit the disclosure; rather, the scope is defined by the appended claims and equivalents. While certain processes in accordance with example embodiments are shown in the figures as occurring in a linear fashion, this is not a requirement unless expressly stated herein. Different processes may be performed in a different order or concurrently.

The present disclosure describes a system and method that generates communication forums based on images that are captured, using a computing device, within a proximate distance and proximate time period of other captured images. For example, a user may take a photograph using his or her computing device. When the photograph is captured, the computing device may associate metadata with that particular photograph, including location information, such as GPS coordinates, and time information. At a later time the metadata associated with that photograph may then be uploaded to a control server. The control server may compare the location and time information of the captured photograph with location and time information of other photographs stored within a database accessible by the control server. From here, the control server may provide the user access to a communication forum that is accessible to another user or a plurality of users who have similarly captured a photograph within a threshold proximal distance and threshold proximal time to the captured image. Alternatively, if there are no other users who have captured an image within the threshold proximal distance and threshold proximate time, the control server may generate a new communication forum for the user. In that regard, no other users will have access to the communication forum until they upload metadata corresponding to a photograph captured within the threshold proximal distance and threshold proximate time to the captured image. However, the user may still post messages to the communication forum that will be saved and made available to other users at such time as they gain access to it.

Figure 1:
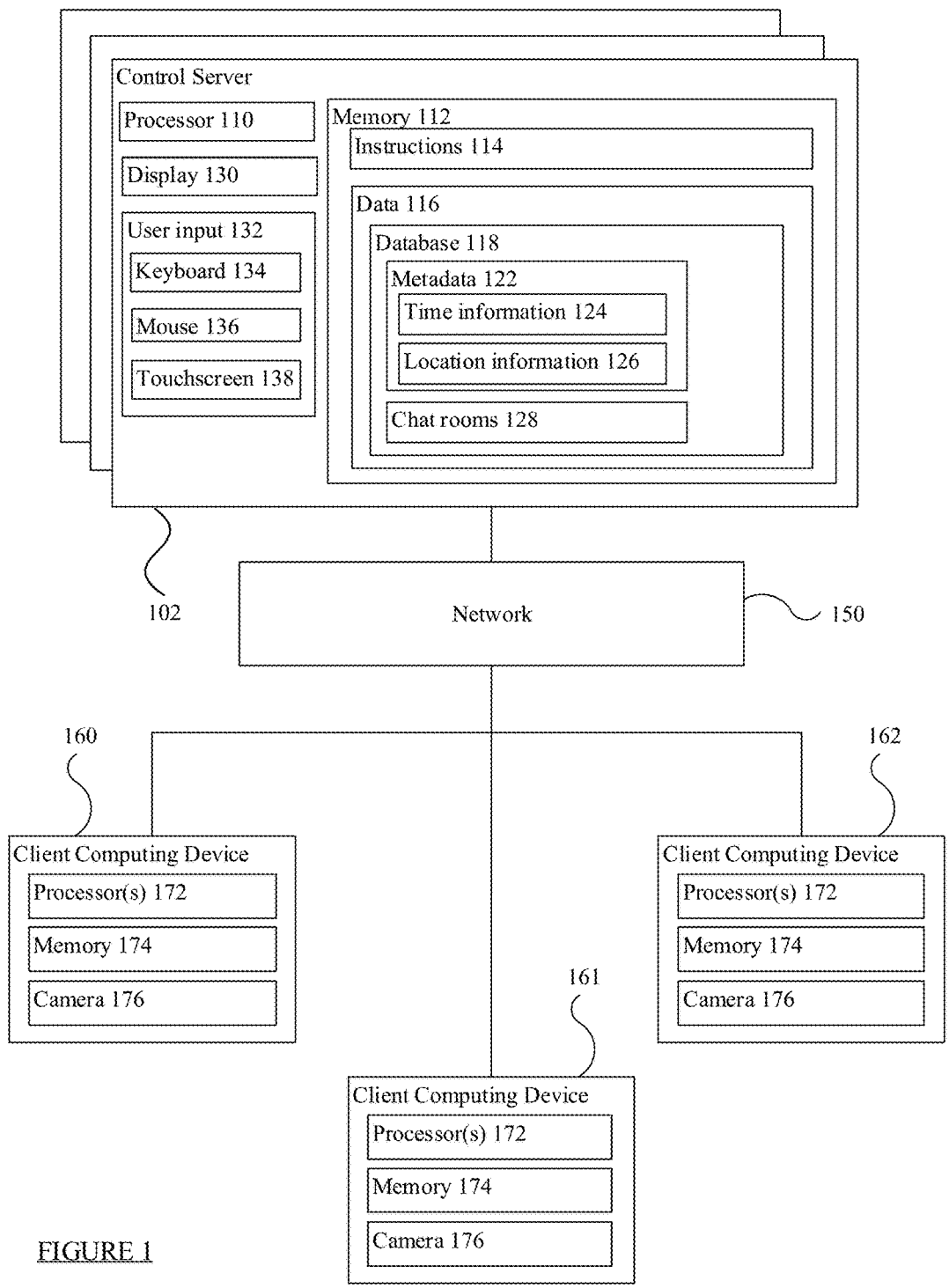
FIG. 1 represents an overview of an exemplary system in accordance with aspects of the disclosure.
Figure 2:
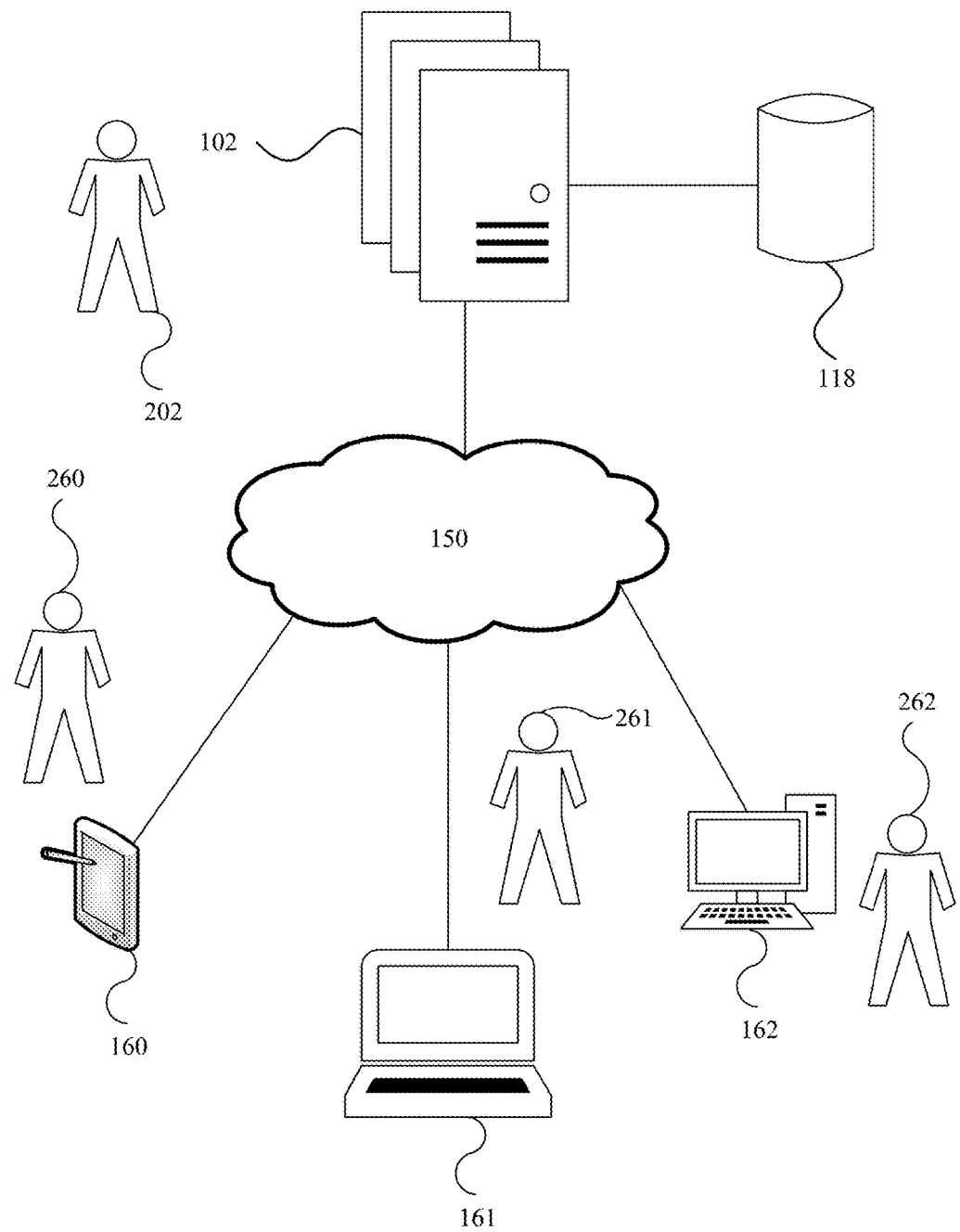
FIG. 2 illustrates a further example of the system of FIG. 1 in accordance with aspects of the disclosure.

FIGS. 1 and 2 include example systems in which the features described above may be implemented. It should not be considered as limiting the scope of the disclosure or usefulness of the features described herein. In this example, the system can include control server 102 and computing devices 160-162. Control server 102 and each of the computing devices 160-162 can contain one or more processors, memory and other components typically present in computing devices.

Memory 112 can include data 116 that can be retrieved, manipulated or stored by processor 110. Memory 112 can be of any non-transitory type capable of storing information accessible by processor 110, such as a hard-drive, memory card, Read Only Memory (ROM), Random Access Memory (RAM), Digital Versatile Disc (DVD), CD-ROM, write-capable, etc.

Instructions 114 can be any set of instructions to be executed directly, such as machine code, or indirectly, such as scripts, by processor 110. In that regard, the terms "instructions," "application," "steps" and "programs" can be used interchangeably herein. Instructions 114 can be stored in object code format for direct processing by the processor, or in any other computing device language including scripts or collections of independent source code modules that are interpreted on demand or compiled in advance. Functions, methods and routines of the instructions are explained in more detail below.

Data 116 can be retrieved, stored or modified by processor 110 in accordance with the instructions 114. For instance, although the subject matter described herein is not limited by any particular data structure, data 116 can be stored in computer registers, in a relational database as a table having many different fields and records, or XML documents. The data can also be formatted in any computing device-readable format such as, but not limited to, binary values, ASCII or Unicode. Moreover, data 116 can comprise any information sufficient to identify the relevant information, such as numbers, descriptive text, proprietary codes, pointers, references to data stored in other memories such as at other network locations, or information that is used by a function to calculate the relevant data.

Referring to FIGS. 1 and 2, data 116 can include database 118 to store various information. For example, information stored in database 118 includes, at least, metadata 122 which includes time information 124 and location information 126, and communication forums 128. Although database 118 is illustrated as being within the same housing as control server 102 in FIG. 1, database 118 may be remote from control server 102, as illustrated in FIG. 2, or alternatively database 118 and control server 102 may be connected over network 150. Network 150 may be a Personal Area Network, Local Area Network, Wide Area Network, or the Internet. Control server 102 can have the capability to read, write, and access data on database 118. Furthermore, database 118 and control server 102 may operate using expandable cloud storage capabilities. In this regard, if database 118 is stored in cloud-based storage, a user may use any computing device, such as a laptop, personal computer, Smartphone, tablet, etc. to access database 118 and control server 102.

Processor 110 can be any conventional processor, such as a commercially available Central Processing Unit ("CPU"). Alternatively, processor 110 can be a dedicated component such as an ASIC or other hardware-based processor.

Control server 102 can include display 130 (e.g., a monitor having a screen, a touch-screen, a projector, a television, or other device that is operable to display information), and user input 132. User input 132 may include, for example, keyboard 134, mouse 136, and touch screen 138. Other input devices are also possible, such as a microphone. In this regard, control server 102 may include only one or a plurality of the various input devices.

Computing device 160 may also include a processor 172 and memory 174, which perform similarly as discussed above with respect to the processor 110 and memory 112 of control server 102, respectively. Furthermore, client computing device may include camera 176 which is configured to capture images. In addition, client computing device 160 may include a Global Positioning System ("GPS") device or other geo-location identifying systems in order to identify the location of computing device 160. For example, the positioning component may include a GPS receiver to determine the particular device's latitude, longitude and/or altitude position, as well as relative location information, such as relative to a particular device or object. Client computing devices 161 and 162 also include a processor, memory, camera, and GPS, and overall may be constructed and configured to operate similarly to client computing device 160 as discussed above.

Although FIG. 1 functionally illustrates processor 110, memory 112, and other elements of the control server 102 as being within the same block, processors, memory, control server, displays, etc. can actually comprise multiple processors, memories, control servers, displays, etc. that may or may not be stored within the same physical housing. For example and as mentioned above, memory 112, such as database 118, can be a hard drive or other storage media located in a housing different from that of control server 102. Accordingly, references to a processor, memory, computer, control server, etc. will be understood to include references to a collection of processors, memories, computers, control servers, etc. that may or may not operate in parallel. For example, control server 102 may include a single server computing device or a load-balanced server farm. And although some functions described below are indicated as taking place on a single computing device having a single processor, various aspects of the subject matter described herein can be implemented by a plurality of computing devices, for example, communicating information over network 150.

Similarly, processor 172 and memory 174 of client computing device 160 may be contained within the same housing or operate remotely from each other, and may include a plurality of components therein. For instance, processor 172, memory 174, and other components of client computing devices 160-162 may be a plurality of processors, memories, etc., and should not be restricted to a single or particular type of processor or memory.

Although client computing devices 160-162 may each comprise a full-sized personal computing device, they may alternatively comprise mobile computing devices capable of wirelessly exchanging data with control server 102 or each other, such as via network 150. FIG. 2 illustrates exemplary computing devices of control server 102 and client computing devices 160-162. By way of example only, client computing devices 160-162 may be a mobile phone (e.g., Smartphone) or a device such as a wireless-enabled PDA, a tablet, a laptop, head-mountable device, Smart watch, or a netbook that is capable of obtaining and transmitting information via the Internet.

Control server 102 and computing devices 160-162 can be at nodes of network 150 and capable of directly and indirectly communicating with other nodes of network 150. Although only a few computing devices are depicted in FIGS. 1-2, it should be appreciated that a typical system can include a large number of connected computing devices, with each different computing device being at a different node of network 150. Network 150 and intervening nodes described herein can be interconnected using various protocols and systems, such that network 150 can be part of the Internet, World Wide Web, specific intranets, Wide Area Networks, or Local Area Networks. Network 150 can utilize standard communications protocols, such as Ethernet, Wi-Fi, and HTTP, that are proprietary to one or more companies, and various combinations of the foregoing. Although certain advantages are obtained when information is transmitted or received as noted above, other aspects of the subject matter described herein are not limited to any particular manner of transmission of information.

As an example, one or more computing devices 160-162 may include a web server that is capable of communicating with control server 102 as well as other computing devices 160-162 via network 150. For example, user 202 of control server 102 may use network 150 to transmit and present information to user 260 on a display of computing device 160. Similarly, users 261 and 262 may use client computing devices 161 and 162 to upload and transmit information to control server 102 that user 202 may view on display 130 or processor using processor 110.

User 260 may use camera 176 on his or her computing device 160 to capture an image. Upon capturing the image, computing device 160 may assign certain metadata therewith. For example, the metadata may include time information and location information about that particular image. It is to be understood that a connection to the server 120 or network 150 is not necessary during this step and that the image may be captured by general purpose camera software that has none of the specialized features described herein, other than the ability to save said metadata. The time information may be the actual time that the user captured the image, such as 1:00 p.m. and 20 seconds, 3:30 p.m. and 10 seconds, etc. The time information may or may not include the seconds. The location information may be acquired using a GPS device, thereby allowing processor 172 of computing device 160 to associate a set of GPS coordinates with that particular captured image. In addition to or as an alternative to using GPS coordinates as the location information, the location information may be an actual physical location or address, such as a store (e.g., Sports Authority™), restaurant (e.g., McDonalds™, Starbucks™), street address, the name of a friend or contact that is associated with an identified address, landmark (e.g., Statue of Liberty), etc. Alternatively or in addition, the location information may be obtained by a Wi-Fi router associated with that given location, or via cellular towers that are able of triangulating or otherwise identifying the location of the user.

Figure 3:
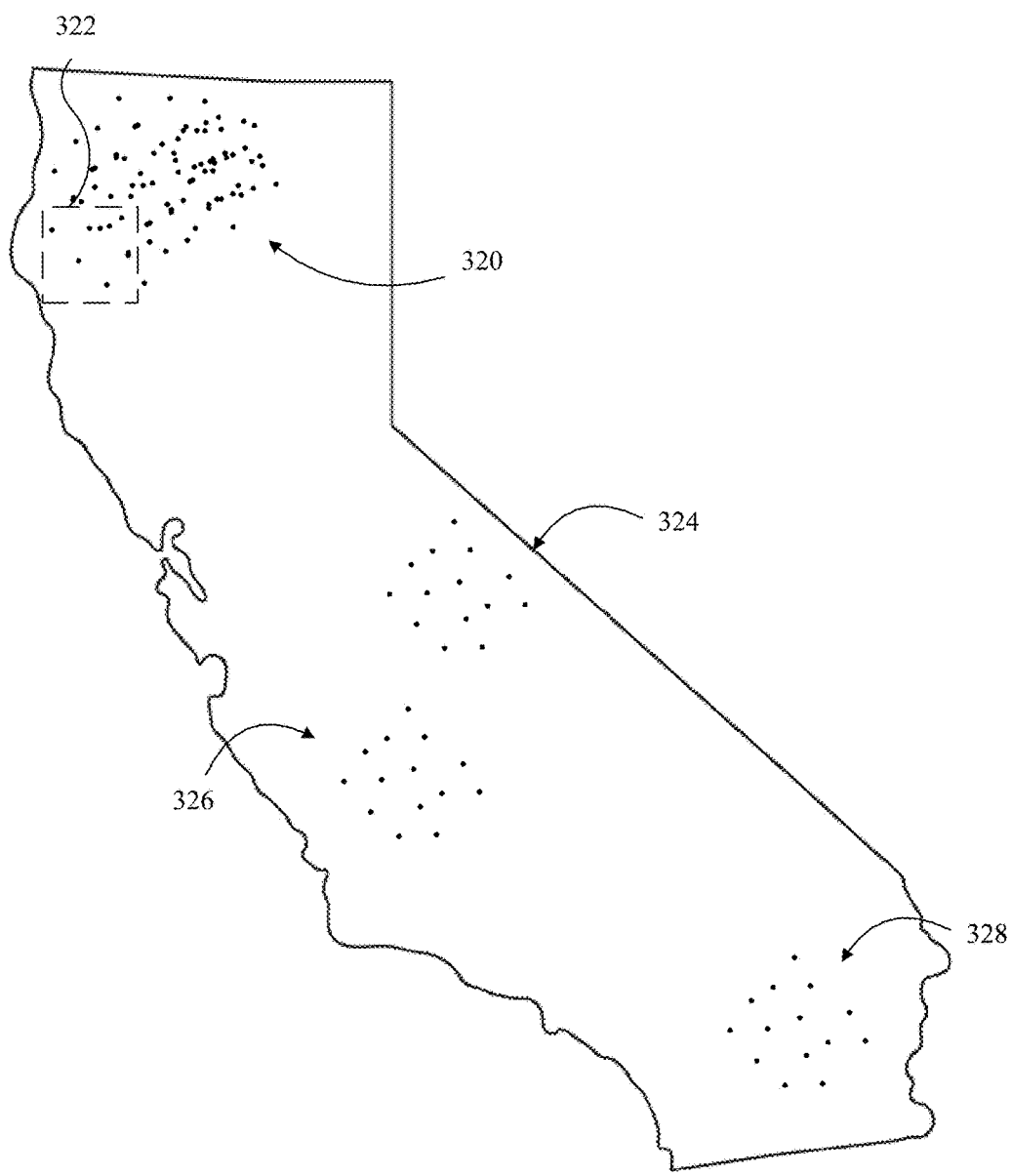
FIG. 3 depicts various locations where images were captured in accordance with aspects of the disclosure.
Figure 4:
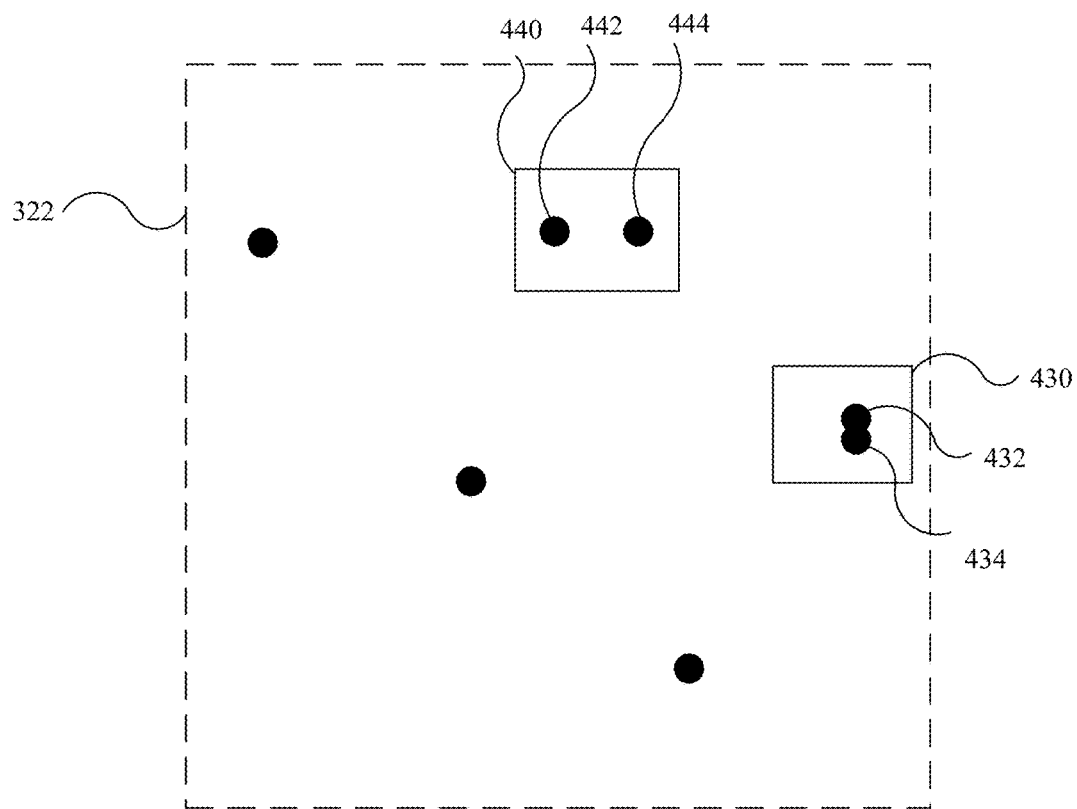
FIG. 4 illustrates clusters of the captured images within a sub-region in accordance with aspects of the disclosure.

FIG. 3 depicts a geographical region of a plurality of locations where images were captured by multiple users. As illustrated in FIG. 3, there are clusters of photographs captured by various users at regions 320, 324, 326, and 328. It should be understood that each particular dot may represent a location of a single captured image or multiple captured images, and as each geographical region is zoomed in on a greater showing of captured images may be shown.

At any time subsequent to capturing the image, computing device 160 may upload the metadata associated with the captured image to control server 102 via network 150, either automatically or manually at the request of user 260. By only uploading the metadata associated with the captured image, each user is able to virtually instantaneously upload all of the metadata associated with not just the captured image, but all of the photos stored on the user's computing device. Therefore, each dot, which represents the metadata associated with a respective captured image, represented in FIG. 3 may have been uploaded to control server 102 via the respective computing device over network 150. Upon receiving the metadata associated with the image from computing device 160, control server 102 may analyze the metadata using processor 110 and subsequently store the metadata associated with the image in database 118 of memory 112. In this regard, control server 102 may only require and store the relevant metadata without the actual image contents itself, thereby saving transmission time over network 150 and storage space in memory. In addition, this also helps protect the privacy associated with the actual content of the images. While the actual image content need not be shared with control server 102, it nonetheless may play an important function on the user's computing device 160, as will be described further below.

After control server 102 has identified the metadata associated with the image from computing device 160, control server 102 may identify the metadata associated with other images that have been uploaded to control server 102 by another user, such as user 161. For example, control server 102 may identify the metadata associated with one or more images that are comparable to the metadata associated with the captured image. For instance, the location information associated with the captured image may include a set of GPS coordinates or a particular address. Control server 102 may access database 118 and perform a comparison analysis of the location information associated with the captured image and location information 126 associated with metadata 122.

The comparison analysis may require a threshold proximate distance between the captured image and stored metadata 122. For example, this threshold distance may be a fixed distance, such as feet, meters, miles, etc. between the two images. The threshold distance may be 20 feet, 50 meters, 2 miles, or any distance of any metric selected by the administrator, such as user 202, associated with control server 102.

A method to determine which image cluster(s) the captured image should be assigned to may begin by finding all existing clusters, if any, that are within a threshold proximate distance of the captured image. The distance between a captured image and an existing cluster may be defined as the Euclidean distance, in 3 dimensional space (latitude, longitude, altitude), between the image location and the cluster centroid, where the cluster centroid is the average of all of the image locations included in the cluster.

To enable an efficient search, a geospatial index may be used to first identify a subset of candidate clusters that might be within the threshold proximate distance on the 2-dimensional plane surrounding the location of the captured image. The actual distance may then be calculated only for this subset of clusters to determine if any are within the threshold proximate distance of the captured image.

If no existing clusters are found within the threshold proximate distance of the captured image, then a new cluster may be created. If only a single cluster is found within a threshold proximate distance, then the captured image may be assigned to that cluster. If more than a single existing cluster is within a threshold proximate distance of the captured image, it may be desirable to assign the captured image to only a single best matching cluster, for example, corresponding to a socially meaningful geographic region like a home, restaurant, park, campus or city. If, upon determining the best cluster assignment, any additional clusters are determined to be nearby, then the captured image may be assigned to those one or more clusters as well.

The foregoing iterative clustering method may produce different results depending upon the order in which captured images are uploaded for clustering. Hence, as metadata from additional captured images become available, the original clustering decisions may be revised. For example, 2 nearby clusters may be combined into 1 if additional images fall in the space between them. Or, a single cluster may be split into multiple clusters if additional images tend to fall in distinct clusters within the original cluster.

By being able to have users be associated with other users who captured images nearby to each other, users may be able to speak to others who have had similar experiences. For example, if user 260 is hiking on an arduous trail and becomes lost, then by capturing an image with his or her computing device 160, the image will be associated with other users who have also captured an image within that area as well. In this regard, user 260 may ask for help, guidance or support from users who have hiked that trail before, or simply discuss the overall enjoyment of hiking that trail. Similarly, users that capture images near a landmark, restaurant, etc., can talk to each other about aspects of that particular location, such as interesting facts about the Statute of Liberty, good or bad food associated with a particular restaurant, etc.

In addition to or as an alternative to creating clusters based on location information, clusters may be generated based on location information and time information. For example, not only would it be sufficient to have a cluster of images from different users for being within a threshold proximate distance from each other, but the cluster may also be based on the captured images being captured within a threshold proximate time of each other. The threshold proximate time may be any amount of time by the administrator of the overall system, such as user 202. By way of example only, the threshold proximate time may be 5 minutes, 30 minutes, 1 hour, 2 hours, and so on.

For example, user 260 may have attended an event, such as a social gathering or party, with user 261. In this regard, users 260 and 261 may only want to discuss the event with each other, and not have others who were not even present on that particular occasion taking part in the discussion.

If control server 102 determines, based on the received metadata, that a captured image was captured within a threshold proximate distance and time of only a single existing cluster, then the captured image may be assigned to that cluster. If a captured image was captured within a threshold proximate distance and time of multiple existing clusters, then control server 102 may determine which of the existing clusters is the best match, or it may assign the captured image to multiple existing clusters. Alternatively, if control server 102 does not identify any images that are within a threshold proximate distance and were captured within a threshold proximate time of the originally captured image, then a new communication forum may be created for that image.

As metadata from additional captured images become available, the distance and time based clusters may be revised. For example, 2 clusters may be combined into a single cluster if metadata from additional images falls between them. Or, a single cluster may be split into smaller clusters, if additional images tend to fall in distinct clusters within the original cluster.

It is important to note that at the time the user captured the image, he or she may not have had the application that provides the user access to control server 102. Therefore, if the user downloads the application, such as onto his or her smart phone, tablet, laptop, etc., then that application may analyze the photo library of the user, including the metadata of images that were captured previously, and upload that metadata to control server 102. This may occur prior to the user's computing device ever transmitted a signal to control server 102. Therefore, not only is the present disclosure capable of analyzing photos that are captured after the user has downloaded the application and made a first contact with control server 102, but the application is able to identify previously captured photos, upload metadata associated with such photos to control server 102, and thereby permit the user access to already generated communication forums and create new ones. As a corollary, the user is not required to activate the downloaded application whenever he or she visit an interesting location or event around which communication might later be desired. Rather, the user may record the location and time metadata by saving images with their standard camera software, and then activate the downloaded application only when they are interested in engaging in communication forums.

The previously captured photos may be photos captured prior to the user ever downloading an application that allows the user to upload metadata to control server 102. Alternatively, the previously captured photos may be photos that were captured using a separate device, such as a camera with only USB capabilities, and the user transferred the photos to his or her computing device. Subsequently, the computing device uploaded the metadata of the photos to control server 102. Thus, control server 102 in communication with the user's computing device is able to receive and process photos as described herein, completely independent of and regardless as to when or how the user captured the image.

As discussed above, by the application only analyzing and uploading the metadata associated with each photo to control server 102, this provides for faster and essentially instantaneous uploading of a user's photo library. Furthermore, if there are no communication forums associated with a given image in the previously captured photo library of the user, control server 102 may nonetheless cluster that given image alone and create a new communication forum based thereon.

Control server 102 may create communication forums based on the notion of distance-based communication forums and distance and time based communication forums, as described in the foregoing. Thus a computing device of a user may include two lists, one showing the distance-based communication forums and one showing the distance and time based communication forums. Although it has been seen in the foregoing that the image content is not needed for the creation of communication forums by control server 102, the image content may nonetheless play an important role on the user's computing device 160, where it may allow the user to identify the real world context of each communication forum. In this regard, the image content may be a more effective memory cue as to the topic and membership of the communication forum than a position on a map or a calendar or other means of representing the metadata.

For example, with respect to FIG. 5, which is discussed in further detail below, display squares 590 contained within each table cell or row may include an image captured by the user. Each captured image contained within each display square 590 may be an image that was captured by the user, which thereby provided the user access to that given communication forum. Put differently, each captured image that placed the user within a cluster, whether that cluster was existing or newly created based on the user's captured image, is displayed adjacent to or is otherwise associated with the communication forum associated with that cluster. Furthermore, if a user captured a plurality of images at a given location and was thereby provided access to a given communication forum, then one image may be selected and thereby contained within the display square 590. The selected image may be automatically selected by control server 102 or the application downloaded on the user's computing device may do so. Alternatively, the user may select the representative image of the plurality of captured images that is displayed in display square 590.

When a user is granted access to a communication forum, that user may accordingly be provided with two levels or stages of identity, namely the anonymity stage and the identified stage. For example, when control server 102 provides the user access to a cluster and thereby a communication forum based on a captured image, it may be helpful for other members of that forum to know that there is another member. However, the user may not wish to have their identity revealed at every location and time where they have captured a photograph. Hence, control server 102 may add all users that are members of that communication forum using a numeral counter, and allow all members to see the count. A user at the anonymity stage may be added into the member count, but no one else in that communication forum is able to see or otherwise identify that user. Thus, the numeral counter may also act as an anonymous indicator that indicates to other users when another member has joined the room, while still maintaining anonymity. Additionally, a user at the anonymity stage may have various features of the communication forum disabled. For example, they may be prohibited from posting forum content.

Subsequently, the user may decide to stay in the anonymity stage or the user may identify himself or herself. For example, the user may be identified by posting a message to the communication forum, or by otherwise checking-in by pressing a button or selecting an option within the application on the user's computing device. In this regard, once the user sends a signal to control server 102 from his or her computing device that indicates the user wishes to participate in the communication forum, then control server 102 may lift the anonymity associated with the user's account. When the user identifies himself or herself, other users may be able to then identify the identity of the user, such as view his or her name, screen name, profile image, etc.

Figure 5:
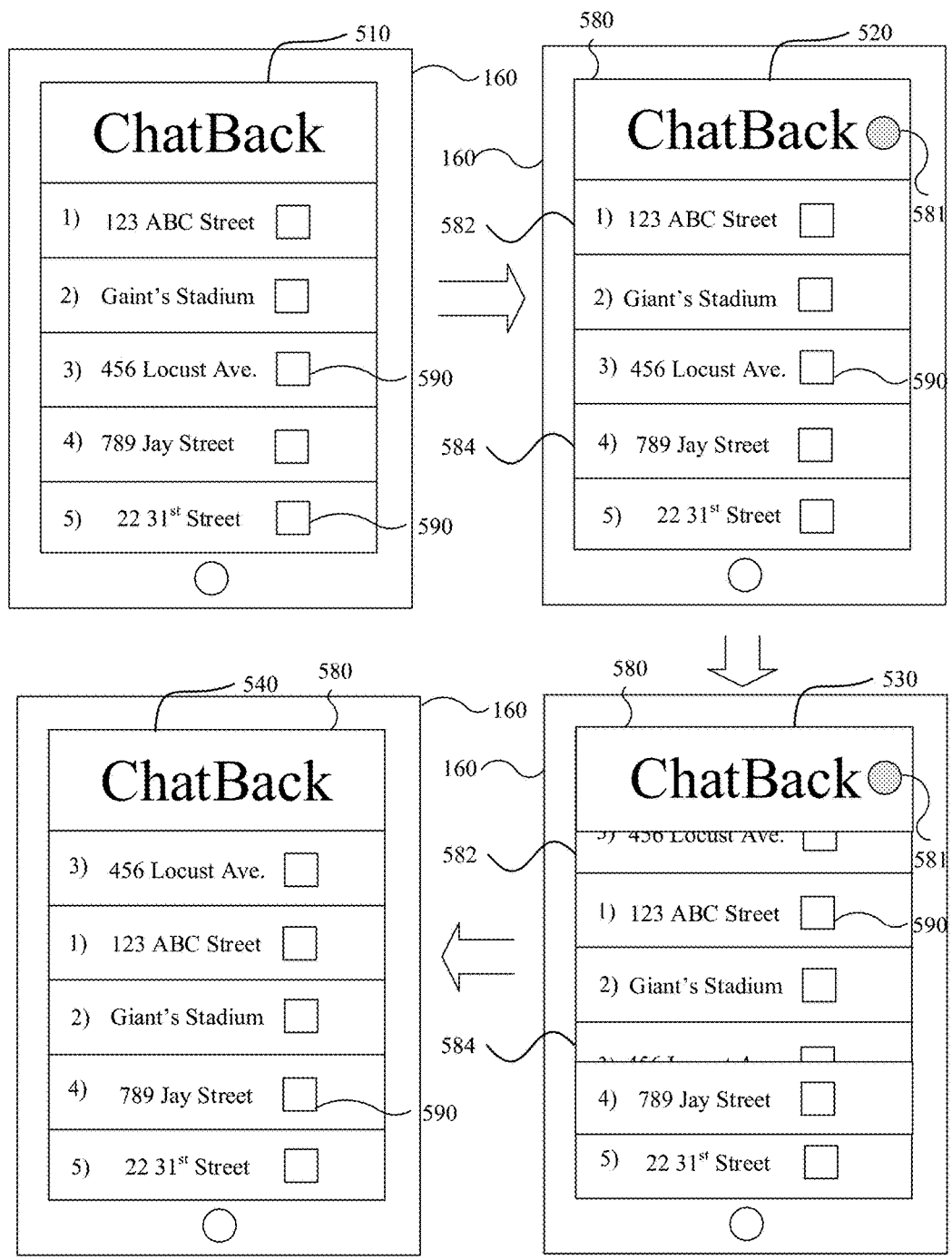
FIG. 5 depicts a list on a computing device being updated in accordance with aspects of the disclosure.
Figure 6:
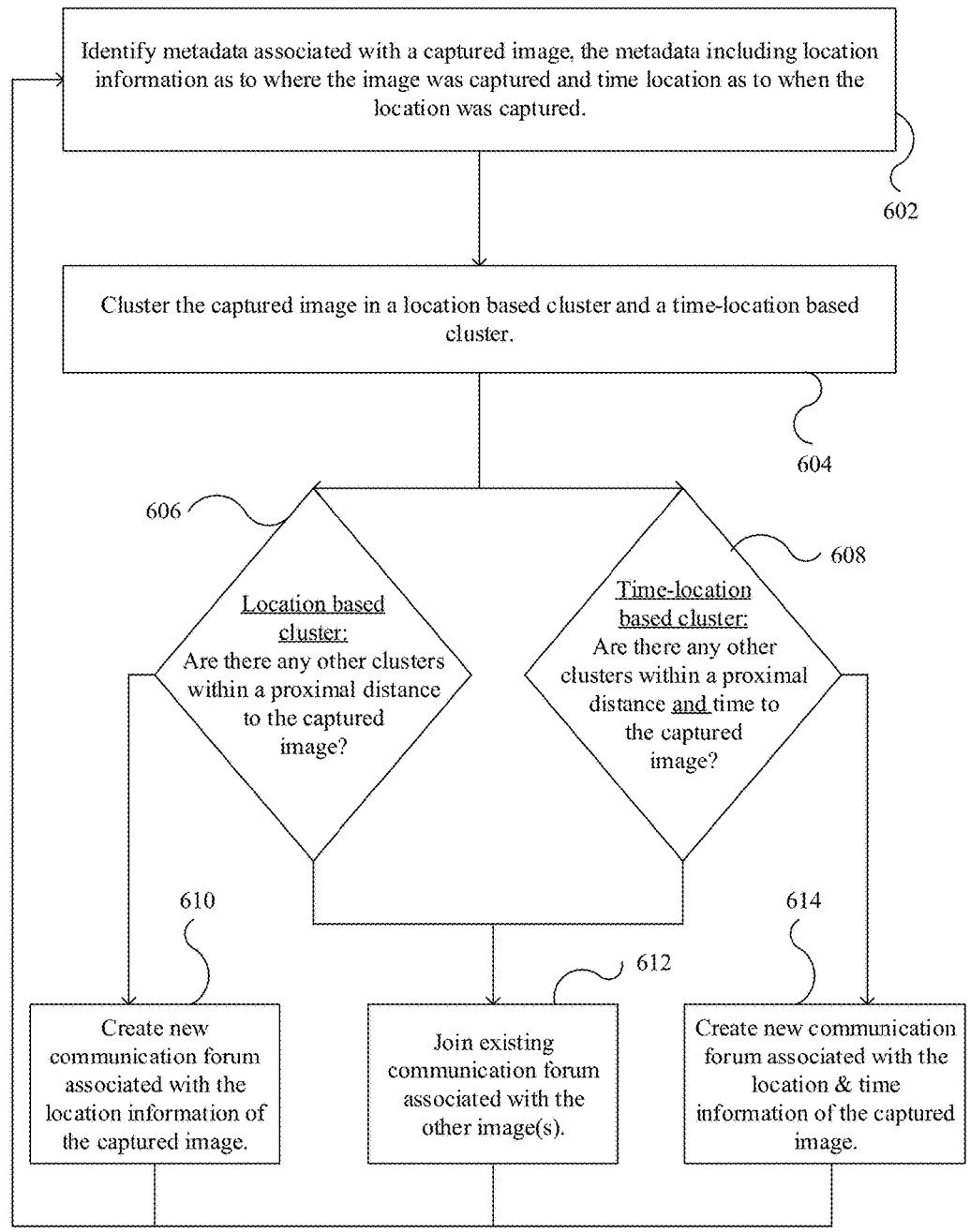
FIG. 6 is a flow chart in accordance with aspects of the disclosure.

Referring now to FIG. 5, this figure illustrates an evolution of displays of a client computing device receiving updates from control server 102. For example, control server 102 may identify and provide access to a new user that captured an image at a given location. Computing device 160 may receive an update such as a signal and other necessary data over network 150 that indicates a new user has been given access to a communication forum associated with user 260. Alternatively, computing device 160 may receive an update that indicates one of the users in a communication forum has posted a message. In this regard, user 260 may want a clean and efficient way for the application to display these updates without interfering or disrupting his or her use of the application.

For instance, display 510 of computing device 160 displays rows 1-5, each row of which represent a communication forum that is associated with a particular location, or cluster, where user 260 captured an image. It should be understood that numbers 1-5 are representative to illustrate the order of the rows, and may or may not be implemented. Display 510 is before the user receives an update from control server 102. On display 520, an update has been received on computing device 160, as illustrated by indicator 581 on the ChatBack title bar 580. In this scenario, communication forum 3 at 456 Locust Ave. received an update. The update may have been that a user posted a message in the communication forum or a new user has been granted access to that communication forum. As illustrated in display 520 the initial effect of the update is to highlight indicator 581 to indicate that there is something new to see at the top of the list. Conceptually, however, communication forum 3 has been duplicated at the top of the list, though not yet visible because it is behind title bar 580.

In this regard, indicator 581 is positioned on title bar 580 as opposed to the actual cell of the communication forum so that the user is always alerted to an update, even if the current item updated is not on display, and also to signal that the updated item is now at the top of list, to be brought into view by scrolling. For instance, if communication forum 6 (not shown) received an alert, then if the indicator was adjacent thereto, the user would not know there is an alert because communication forum 6 is not currently within the window of the user's display. Thus, by placing indicator 581 on title bar 580, the user can always be alerted that there is an update. Accordingly, indicator 581 on title bar 580 serves at least two purposes. First, indicator 581 signals to the user that there is an update at a communication forum. Second, indicator 581 signals to the user that the user can scroll in a manner that exposes the top of the list, which will display the updated communication forum at the top of the list, as discussed in further detail below.

For instance, referring now to display 530, as the user scrolls to the top of the list on the display of computing device 160, duplicated communication forum 582 begins to appear as the original communication forum 584 disappears. Specifically, as the bottom portion of duplicated communication forum 582 appears, the same bottom portion of original communication forum 584 disappears in synchrony. This allows for a smooth removal of original communication forum 584, with user 260 not being disoriented, disrupted, or confused as a result of the update. Finally, display 540 illustrates the new organization of the communication forums upon the user scrolling back up to the top of the list.

FIG. 7 illustrates a flowchart of at least a portion of the processes described above. For instance, at step 602 the system identifies metadata associated with a captured image, the metadata including location information as to where the image was captured and time information as to when the image was captured. At step 604 the metadata associated with the captured image is clustered in a location based cluster and a location and time based cluster. For instance, decision step 606 depicts a location based cluster determination, where the system determines if there are any existing image clusters, based on the metadata associated therewith, within a proximate distance to the captured image. In addition, decision step 608 depicts the time-location based cluster, where the system determines if there are any existing image clusters, based on the metadata associated therewith, that were captured within a threshold distance and within a threshold time frame of the captured image. It should be understood that decision steps 606 and 608 may both be performed by the system, such as control server 102, or only one of which may be performed.

If the system determines that there is at least one image cluster that is a threshold proximate distance from the captured image, then decision step 606 moves on to step 612. Similarly, if the system determines that there at least one image cluster that was captured a threshold proximate distance from the captured image and the image cluster was captured within a threshold proximate time of the captured image, then decision step 608 moves onto step 612. At step 612, the control server allows the user associated with the captured image to join the communication forum associated with the metadata of the image cluster. The user associated with the captured image would be granted access to the communication forum using the metadata associated with the captured image. It should be understood that the location based cluster and the time based cluster may be two distinct clusters.

Alternatively, if at decision step 606 the system determines, based on the metadata, that there are no image clusters that are within a threshold proximate distance to the captured image, then the system may create a communication forum based on the location information associated with the captured image, as illustrated at step 610. In this regard, the captured image will form a new cluster until control server 102 receives metadata of other images that were captured within a threshold proximate distance to the captured image. Similarly, if at decision step 608 the system determines that there are no image clusters that are within a threshold proximate distance to the captured image and include time information that is within a threshold time frame of the captured image, then the system may create a new communication forum as illustrated at step 614. In this regard, the captured image will form its own cluster until control server 102 receives metadata of other images that were captured within a threshold proximate distance and within a threshold proximate time of the captured image. This process may repeat itself upon control server 102 receiving additional metadata associated with additional images from users.

As another embodiment, control server 102 may place a limit as to how much metadata associated with images a single user can upload if control server 102 detects the possibility of spam. For example, unrealistic amounts of images can be associated with each user, such that any user that uploads too much metadata that represents a significant amount of images to control server 102 will be identified and subsequently blocked. In this regard, control server 102 is able to identify unrealistic patterns of metadata uploads that are associated with images, and react thereby to protect the overall system, including the veracity of the contents of the system.

As an alternative embodiment, control server 102 may operate without knowledge of any user identities or accounts by which metadata from multiple images submitted by a single user could be recognized. Rather, the particular metadata associated with an image will in and of itself provide access to a communication forum, and the server would have no knowledge what other metadata a particular user may have submitted. This embodiment would limit performance and functionality along several dimensions, but would provide additional privacy to the user by preventing the control server 102 from tracking their movements among different locations.

Furthermore, control server 102 may independently vary the threshold proximate distance and time based on the given situation. As one example, Control server 102 may alter the threshold proximate distance based on the identified location. For instance, if control server 102 determines that a user is in a restaurant, then control server 102 may thereby restrict clustering—and thereby the associated communication forum—to images that were captured within that restaurant. For example, users that are at a Mexican restaurant, which is next door to an Italian restaurant, may be quite proximate to each other, but nonetheless the two individuals may likely have been at completely different gatherings, events, parties, etc.

Similarly, control server 102 may alter the threshold proximate time based on the situation as well. For example, control server 102 may alter the threshold proximate time based on the location of the individual. Alternatively or in addition, control server 102 may later adjust the threshold proximate time based on the amount of metadata associated with the respective images that control server 102 has received within a given time frame. For example, control server 102 may identify that numerous metadata associated with respective images were uploaded within a certain time frame, such as between 1:00 p.m. and 2:00 p.m., and then the amount of images drop off significantly until 3:00 p.m. In this regard, control server 102 may determine that the metadata of the respective images uploaded between 1:00 p.m. and 2:00 p.m. were images associated with one group of people, and the images that begin to be captured at 3:00 p.m. are images associated with another group of people. Further, if control server 102 determines that images are captured constantly for 2 hours, 15 minutes, 45 minutes, or any amount of time, control server 102 may adjust the threshold proximate time frame based thereby.

As a further embodiment, over time control server 102 may alter the threshold proximate distance and time of previously assigned clusters and communication forums based on changes. For example, as more metadata of respective images are uploaded by different users to control server 102, it may become apparent that the originally selected thresholds should be refined to better cluster the users therein. In this regard, as additional metadata of respective images are uploaded to control server 102, adjustments to threshold proximate distance and time may occur, and thereby adjustments to the cluster and ultimately the users in the communication forums.

As a further example, examination of the time metadata associated with images may assist the assignment of a given image to a particular cluster. For example, if a first existing cluster is 20 meters away and contains many images taken at nearly the same time as the captured image, and a second existing cluster is 15 meters away but contains no images nearby in time, the captured image may be assigned to the first existing cluster. If none of the existing clusters contain images that are nearby in time to the captured image, then the captured image may be assigned to whichever cluster contains the image that is geographically closest to the captured image.

As another embodiment, multiple images that are captured by a single user within a short time frame may be considered by control server 102 as a single unit for purposes of clustering with other users. When images from a single user are being clustered to create such a unit, the control server 102 may utilize a sliding scale based on location and time to determine if images should be clustered in the same unit or not. For instance, if 2 images were captured closer together in time, it is more likely that they were captured at the same location, so the threshold proximate distance can be increased to accommodate a larger location, e.g., a park rather than a restaurant. For example, if the second image is captured within 15 minutes of the first image, then control server 102 may require that the threshold proximate distance be within 200 meters of the first image in order to be part of the same unit. If the second image is captured within 1 hour of the first image, then the threshold proximate distance may be within 100 meters of the first image in order to be part of the same unit. Otherwise, the threshold proximate distance may be within 50 meters of the first image in order to be part of the same unit. Alternatively, every fraction of time, such as second or minute, which passes by, may affect the threshold proximate distance used to determine membership in the same unit.

As a further embodiment, control server 102 may identify GPS coordinates associated with multiple images that are captured at a single location within a short time span, and use the GPS coordinates associated with the later acquired images. For example, the GPS of the computing device may be more accurate the longer the user is at a given location. Therefore, if multiple images are taken by the computing device, control server 102 may take the GPS coordinates associated with the later-captured images for greater accuracy.

As a further embodiment, control server 102 may begin to learn and make associations between users who oft-times capture images within the threshold proximate distance and times, thereby are often clustered with each other and within the same communication forums. In this regard, control server 102 may associate and thereby store within database 118 that two or more users are friends with each other. When control server 102 identifies in the future that both users are close to each other, but not close enough to satisfy the threshold proximate distance, then control server may nonetheless cluster the two together. For example, control server 102 may determine that the GPS coordinates are incorrect for one or both of the users. Furthermore, if control server 102 has determined that one or both of the users are often at a nearby location, but the current GPS coordinates are slightly different, then control server 102 may independently adjust the uploaded metadata, at least for the time being.

Advantages of the present application include the opportunity for users to communicate with other users who were at similar events or at the very least partake in similar activities. For example, by providing access to users who have captured images within a threshold proximate distance from each other, people who have visited similar locations can communicate about their experiences at the location. For example, users may communicate about experiences at restaurants, land marks, hiking trails, stores, entertainment centers, etc.

In addition, the present technology provides essentially exclusive access to users who all attended similar events, whether planned ahead or coincidentally. For example, friends may organize a gathering at a house to celebrate a holiday, birthday, etc., and in those situations only the people who attended those events can participate in the communication forum created by the control server discussed herein. Friends may also share these experiential events at restaurants and entertainment complexes such as movies, ball games, etc. This way, attendees of these events do not need to be concerned with unwanted and random people, or even acquaintances and other friends, which may include themselves into the event that may have been exclusive or private. Furthermore, even users who may not have known each other at the time and location of the event can meet and discuss details of the event with each other, knowing that the other users in the communication forum were actually present at the relatively same location and relatively same time. Thus, the present technology at the very least is a more intimate way for users to discuss and meet each other about like-minded events or hobbies.

Furthermore, the present technology provides an automatic classification system by which users may prioritize their attention to communications. In effect, each of their saved photos may be seen to represent a distinct inbox where communications around that location or event are sorted. A new message associated with a photo taken at one event, for example, may be of more immediate interest than one associated with a photo taken at a different event.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method, comprising:
   receiving, using one or more processors, metadata associated with a first image and not receiving the first image, wherein the metadata includes location information as to where the first image was captured;
   generating, using the one or more processors, a first cluster associated with the first image based on the location information;
   generating, using the one or more processors, a first communication forum that is associated with the first cluster; and
   permitting, using the one or more processors, a first user access to the first communication forum only when the first user is associated with a first computing device that was used to capture the first image.

2. The method of claim 1, wherein the metadata further includes time information as to when the first image was captured, and further comprising:
   generating, using the one or more processors, a second cluster associated with the first image based on the location information and the time information;
   generating, using the one or more processors, a second communication forum that is associated with the second cluster; and
   permitting, using the one or more processors, the first user access to the second communication forum only when the first user is associated with a first computing device that was used to capture the first image.

3. The method of claim 2, further comprising:
   identifying, using the one or more processors, metadata of a second image that was captured within a threshold proximate distance and within a threshold proximate time of the second cluster;
   including, using the one or more processors, the second image into the second cluster; and
   permitting, using the one or more processors, a second user access to the second communication forum only when the second user is associated with a second computing device that was used to capture the second image.

4. The method of claim 3, further comprising:
   providing, using the one or more processors, the second user access to the second communication forum under anonymity, such that no other user within the second communication forum is able to identify an identity of the second user;
   providing, using the one or more processors, an anonymous indicator, wherein the anonymous indicator at least indicates a change in an amount of users within the second communication forum when the second user is provided access to the second communication forum, and the anonymous indicator does not identify the identity of the second user; and
   upon a control server receiving a signal from the second user, revealing the identity of the second user to the other users within the second communication forum.

5. The method of claim 3, wherein, after the threshold proximate distance and the threshold proximate time of the second cluster are developed, the threshold proximate distance and the threshold proximate time associated with the second cluster adjust according to a sliding scale, such that the threshold proximate distance varies based on a time the second image was captured relative to the second cluster.

6. The method of claim 5, wherein, after the threshold proximate distance and the threshold proximate time of the second cluster are developed, a distance of the threshold proximate distance adjusts based on a proximity in time between at least two images, such that the distance of the threshold proximate distance decreases the closer in time the at least two images are captured, and the distance of the threshold proximate distance increases the relatively further in time the at least two images are captured.

7. The method of claim 2, further comprising:
   displaying, using the one or more processors, on a display of the first computing device an event list and a place list, wherein the event list only displays communication forums that are based on location and time information, and the place list only displays communication forums that are based on location information.

8. The method of claim 1, wherein the first image was captured at a time prior to the first user transmitting a first signal to a control server from any computing device associated with the first user.

9. The method of claim 1, wherein, after the second cluster is developed, splitting the second cluster into multiple clusters based on the metadata associated with additional images.

10. A system, comprising:
    memory; and
    one or more processors operatively coupled to the memory, wherein the one or more processors are configured to:
    receive metadata associated with a first image and not receive the first image, wherein the metadata includes location information as to where the first image was captured;
    generate a first cluster associated with the first image based on the location information;
    generate a first communication forum that is associated with the first cluster; and
    permit a first user access to the first communication forum only when the first user is associated with a first computing device that was used to capture the first image.

11. The system of claim 10, wherein the metadata further includes time information as to when the first image was captured, and the one or more processors are further configured to:
    generate a second cluster associated with the first image based on the location information and the time information;
    generate a second communication forum that is associated with the second cluster; and
    permit the first user access to the second communication forum only when the first user is associated with a first computing device that was used to capture the first image.

12. The system of claim 11, wherein the one or more processors are further configured to:
    identify metadata of a second image that was captured within a threshold proximate distance and within a threshold proximate time of the second cluster;
    include the second image into the second cluster; and
    permit a second user access to the second communication forum only when the second user is associated with a second computing device that was used to capture the second image.

13. The system of claim 12, wherein the one or more processors are further configured to:
    provide the second user access to the second communication forum under anonymity, such that no other user within the second communication forum is able to identify an identity of the second user;
    provide an anonymous indicator, wherein the anonymous indicator at least indicates a change in an amount of users within the second communication forum when the second user is provided access to the second communication forum, and the anonymous indicator does not identify the identity of the second user; and
    upon a control server receiving a signal from the second user, reveal the identity of the second user to the other users within the second communication forum.

14. The system of claim 12, wherein, after the threshold proximate distance and the threshold proximate time of the second cluster are developed, the threshold proximate distance and the threshold proximate time associated with the second cluster adjust according to a sliding scale, such that the threshold proximate distance varies based on a time the second image was captured relative to the second cluster.

15. The system of claim 11, wherein the one or more processors are further configured to display on a display of the first computing device an event list and a place list, wherein the event list only displays communication forums that are based on location and time information, and the place list only displays communication forums that are based on location information.

16. The system of claim 10, wherein the first image was captured at a time prior to the first user transmitting a first signal to a control server from any computing device associated with the first user.

17. A non-transitory, tangible computer readable medium on which instructions are stored, the instructions, when executed by a processor cause the processor to perform a method, the method comprising:
    receiving metadata associated with a first image and not receiving the first image, wherein the metadata includes location information as to where the first image was captured;
    generating a first cluster associated with the first image based on the location information;
    generating a first communication forum that is associated with the first cluster; and
    permitting a first user access to the first communication forum only when the first user is associated with a first computing device that was used to capture the first image.

18. The non-transitory computer readable medium of claim 17, wherein the metadata further includes time information as to when the first image was captured, and further comprising:
    generating a second cluster associated with the first image based on the location information and the time information;
    generating a second communication forum that is associated with the second cluster; and
    permitting the first user access to the second communication forum only when the first user is associated with a first computing device that was used to capture the first image.

19. The non-transitory computer readable medium of claim 18, further comprising:
    identifying metadata of a second image that was captured within a threshold proximate distance and within a threshold proximate time of the second cluster;
    including the second image into the second cluster; and
    permitting a second user access to the second communication forum only when the second user is associated with a second computing device that was used to capture the second image.

20. The non-transitory computer readable medium of claim 19, further comprising:
    providing the second user access to the second communication forum under anonymity, such that no other user within the second communication forum is able to identify an identity of the second user;
    providing an anonymous indicator, wherein the anonymous indicator at least indicates a change in an amount of users within the second communication forum when the second user is provided access to the second communication forum, and the anonymous indicator does not identify the identity of the second user; and upon a control server receiving a signal from the second user, revealing the identity of the second user to the other users within the second communication forum.

\* \* \* \* \*